Nov. 21, 1961  C. E. FREY  3,009,164
DETACHABLY CONNECTED GLOVE AND SLEEVE
Filed March 9, 1960

INVENTOR.
Charles E. Frey
BY
Frease, Bishop, Johns & Schick
ATTORNEYS

United States Patent Office 3,009,164
Patented Nov. 21, 1961

3,009,164
DETACHABLY CONNECTED GLOVE
AND SLEEVE
Charles E. Frey, Carrollton, Ohio, assignor to The Surety Rubber Company, Carrollton, Ohio, a corporation of Ohio
Filed Mar. 9, 1960, Ser. No. 13,773
5 Claims. (Cl. 2—270)

The invention relates to combined gloves and sleeves formed of rubber, synthetic rubber or similar plastic materials, and more particularly to detachably connected gloves and sleeves adapted for dry box work.

Many operations in connection with atomic energy, electronics and the like must be performed in a dry box, in which the hands and arms of the workman are protected by gloves having long sleeves, formed of rubber, synthetic rubber or flexible plastic materials.

The upper, open ends of the sleeves are clamped in ports or openings in the dry box, and the workman inserts his hands and arms therein so as to perform the work within the dry box.

All sizes and thicknesses of gloves and sleeves are required in order to fit workmen with various sizes of hands, and for properly performing various kinds of work within the dry box, thus necessitating many different sizes of porcelain forms and other equipment in the manufacture of such golves and sleeves, adding greatly to the cost of the combined gloves and sleeves.

In many cases heavy sleeves and thin gloves are required for the work. As the gloves wear out very quickly, it has been customary in the past to discard the combined glove and sleeve. Because of the high cost of these articles, some attempts have been made to cut the damaged glove off of the sleeve and cement a new glove to the sleeve. This is not only a costly operation, but it is not usually satisfactory, as it is very difficult to cement cured rubber or synthetic rubber parts together.

There are also many cases where an air-tight seal is required, and up to the present time only the very expensive, long, one-piece glove and sleeve could be used for such purposes.

The present invention contemplates the provision of separate sleeves and gloves formed of rubber, synthetic rubber and the like, with means for detachably connecting the glove to the sleeve, whereby a worn out or damaged glove may be quickly and easily detached from the sleeve and a new glove attached thereto.

Another object of the invention is to provide a sleeve of rubber or the like having a preformed annular corrugation at the wrist portion thereof, the wrist portion of the glove being inserted therein and detachably connected to the sleeve by means of a ring of metal, plastic material or the like inserted into the wrist portion of the glove and holding it within the corrugation of the sleeve.

A further object of the invention is to provide such a sleeve having spaced preformed corrugations into which the wrist portion of the glove is forced by spaced rings of metal or the like to form an air-tight seal between the glove and the sleeve.

A still further object of the invention is to provide a detachable glove and sleeve of the character referred to in which the spaced rings are mounted as a unit upon an annular band.

The above objects together with others which will be apparent from the drawing and following description, or which may be later referred to, may be attained by constructing the detachably connected glove and sleeve in the manner hereinafter set forth in detail and illustrated in the accompanying drawing.

The invention may be described in general terms as comprising a sleeve formed of rubber, synthetic rubber or pliable plastic material having an outwardly disposed annular corrugation of substantially semi-circular cross section preformed in the wrist portion thereof.

The glove is formed of rubber, synthetic rubber or pliable plastic material, which may be of the same thickness as the sleeve or of any other thickness adapted for the particular work to be performed.

A rigid or semi-rigid ring formed of metal, plastic material or the like, of substantially circular cross section, is inserted into the wrist portion of the glove which is then inserted into the wrist portion of the sleeve, the ring pressing the adjacent portion of the glove into the preformed corrugation in the sleeve, to detachably connect the glove to the sleeve.

In the modified form of the invention for providing an air-tight seal between the sleeve and the glove, the sleeve has a spaced pair of annular corrugations formed in the wrist portion thereof. A spaced pair of rings, of substantially circular cross section, are connected in spaced relation, as by an annular band, and inserted into the wrist portion of the glove for pressing the same into the preformed corrugations in the sleeve.

An elastic ring of substantially circular cross section is then located around the sleeve, between the preformed corrugations therein, for pressing the wrist portions of the sleeve and glove, between said spaced rings, inwardly against said annular band to form an air-tight seal between the sleeve and glove.

Having thus briefly described the invention, reference is now made to the disclosure in the accompanying drawings, in which.

Referring now more particularly to the embodiments of the invention illustrated in the drawing, in which similar numerals refer to similar parts throughout, a dry box is indicated generally at 1 in FIG. 1.

Figure 1:
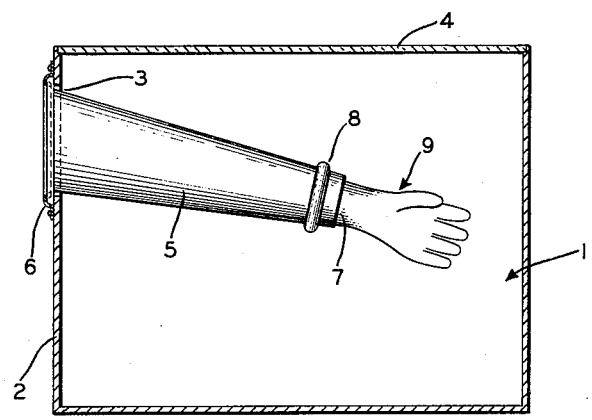
FIG. 1 is a sectional view through a dry box, showing a sleeve and glove therein detachably connected together in accordance with an embodiment of the invention.

The dry box is of conventional construction, the front wall 2 thereof having two spaced port openings 3 therein, only one of which is shown. These openings are so located that a workman may insert his hands and arms therethrough for working within the box. A transparent window 4 is provided in the top of the box, in customary manner, so that the workman may have a clear view of the work being performed within the box.

As in usual practice, the upper or outer end of a sleeve 5, formed of rubber, synthetic rubber, or pliable plastic material, is clamped within each opening 3, by any usual and well known means, as indicated at 6. Ordinarily, a glove is formed integrally with the inner end of the sleeve.

When these long-sleeved gloves are attached to the openings in the dry box, the workman then inserts his hands and arms therein so that he may do the necessary work within the dry box.

Figure 2:
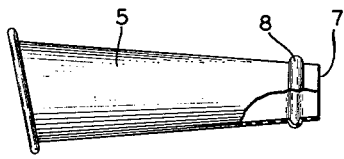
FIG. 2 is a detached elevation of the sleeve with parts broken in section.

In the present invention, the sleeve 5, as shown in FIG. 2, terminates at the wrist end 7 thereof, and a glove is adapted to be detachably connected thereto in the manner to be later described in detail.

For this purpose an outwardly disposed annular corrugation 8, of substantially semi-circular cross section, is preformed in the wrist portion of the sleeve 5.

The glove indicated generally at 9 may be formed of rubber, synthetic rubber or pliable plastic material, and may be of conventional glove construction. This glove may be of the same thickness of material as the sleeve, or may be of any other desired thickness, and for some kinds of work may be of much less thickness than the sleeve.

Figure 3:
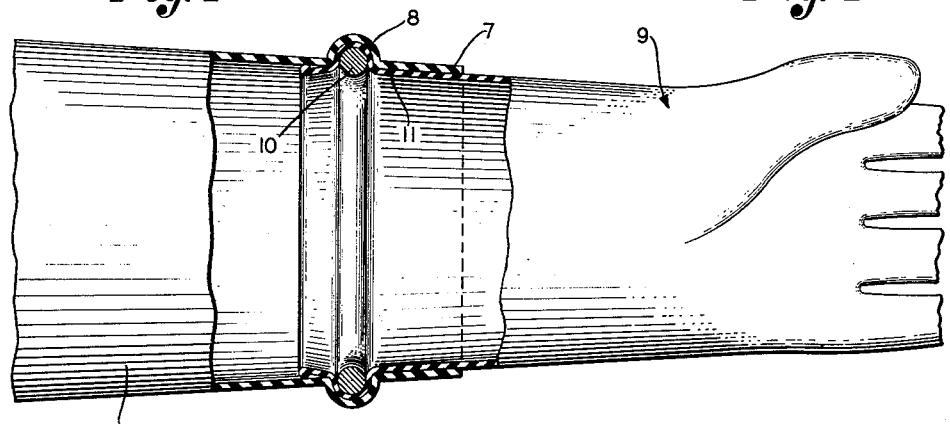
FIG. 3 is an enlarged, fragmentary sectional elevation showing a glove detachably connected to a sleeve.

In carrying out the invention to detachably connect the glove to the sleeve, a ring 10, as shown in FIG. 3, is inserted into the wrist portion 11 of the glove. This ring is rigid or semi-rigid, and is formed of metal or plastic material, and may be substantially circular in cross section.

The wrist portion 11 of the glove, with the ring 10 thus inserted therein, is then inserted into the wrist portion of the sleeve, as shown in FIG. 3, the ring 10 pressing the adjacent wrist portion of the glove into the preformed corrugation 8 of the sleeve so as to detachably connect the glove to the sleeve.

When the sleeves 5, with gloves 9 detachably connected thereto, are inserted through the openings in the dry box and clamped thereto, the workman may insert his hands and arms into the sleeves and gloves in usual manner for performing the work within the dry box.

If either of the gloves 9 becomes worn out or damaged, it may be quickly and easily detached from the sleeve 5 and discarded and a new glove may be quickly attached to the sleeve in the manner above described.

This provides a considerable saving, since the gloves, which may be of conventional construction, are relatively inexpensive as compared with the one-piece long-sleeve gloves now in general use for dry box work.

Figure 4:
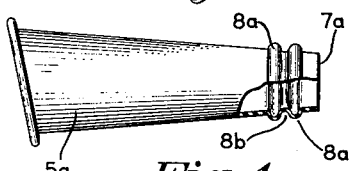
FIG. 4 is a detached elevation of a modified form of sleeve having two spaced preformed corrugations therein.
Figure 5:
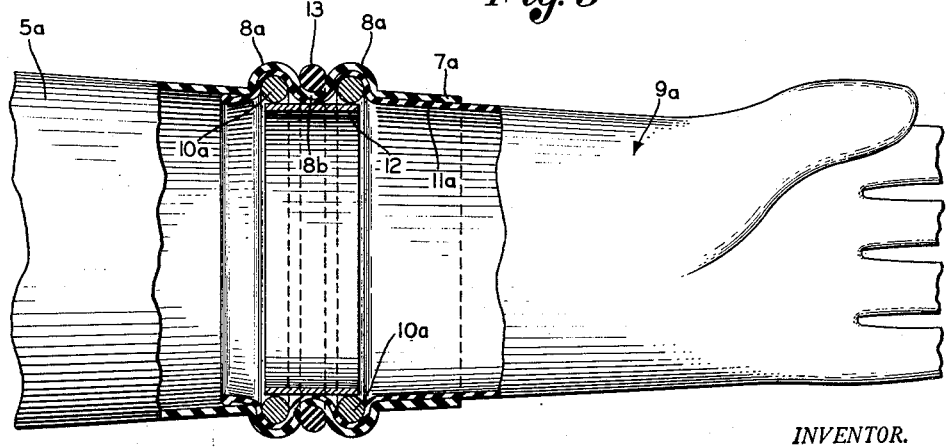
FIG. 5 is an enlarged, fragmentary sectional elevation showing the manner of detachably connecting a glove to a sleeve to provide an air-tight seal.

In FIGS. 4 and 5 is shown an embodiment of the invention especially adapted for use in cases where an air-and-gas-tight seal is necessary between the glove and sleeve.

For this purpose the sleeve 5a is provided near the wrist end 7a thereof with a spaced pair of preformed, outwardly disposed annular corrugations 8a, with an inwardly disposed annular corrugation 8b therebetween. Each of the corrugations 8a and 8b may be substantially semi-circular in cross section, as best shown in FIG. 5.

The glove 9a may be of conventional form. An annular band 12, which may be flat in cross section as shown in FIG. 5, has a spaced pair of rings 10a mounted thereon. The band 12 and rings 10a may each be substantially rigid or semi-rigid, and may be formed of metal or suitable plastic material. The rings 10a are preferably of substantially circular cross section.

This annular band 12 with spaced rings 10a thereon is inserted into the wrist portion 11a of the glove, which is then inserted into the wrist portion of the sleeve, the rings 10a pressing the wrist portion of the sleeve into preformed corrugations 8a in the sleeve, as shown in FIG. 5.

An elastic ring 13 of circular cross section, and formed of rubber, synthetic rubber or the like, is then located in the inwardly disposed annular corrugation 8b of the sleeve, pressing the same and the adjacent portion of the wrist of the glove tightly together upon the annular band 12, and against opposed sides of the rings 10a, so as to provide an air-and-gas-tight joint between the glove and the sleeve.

From the above it will be obvious that a simple, inexpensive and efficient means is provided for detachably connecting gloves and sleeves of rubber, or the like, for dry box work, and providing for an air-and-gas-tight seal where the same is necessary.

It will also be seen that a considerable saving is provided, as the relatively inexpensive gloves, which quickly wear out, may be discarded and new gloves attached to the relatively expensive sleeves which ordinarily outwear many gloves.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A combined glove and sleeve for dry box work comprising a sleeve formed of rubber-like material, a spaced pair of outwardly disposed annular corrugations preformed in one end portion of the sleeve, a glove formed of rubber-like material and comprising a hand portion and a wrist portion, the wrist portion of the glove being inserted into said one end portion of the sleeve, an annular band with spaced rings thereon located within said wrist portion of the glove at a point coinciding with said annular corrugations in the sleeve, said rings pressing the wrist portion of the glove into the preformed corrugations of the sleeve to detachably connect the glove to the sleeve, and means pressing the portion of the sleeve between said preformed corrugations and the adjacent portion of the glove together and against said band.

2. A combined glove and sleeve for dry box work comprising a sleeve formed of rubber-like material, a spaced pair of ouwtardly disposed annular corrugations of substantially semi-circular cross section preformed in one end portion of the sleeve, a glove formed of rubber-like material and comprising a hand portion and a wrist portion, the wrist portion of the glove being inserted into said one end portion of the sleeve, an annular band with a spaced pair of substantially rigid rings of substantialy circular cross section thereon located within said wrist portion of the glove at a point coinciding with said annular corrugations in the sleeve, said rings pressing the wrist portion of the glove into the preformed corrugations of the sleeve to detachably connect the glove to the sleeve, and means pressing the portion of the sleeve between said preformed corrugations and the adjacent portion of the glove together and against said band.

3. A combined glove and sleeve for dry box work comprising a sleeve formed of rubber-like material, a spaced pair of outwardly disposed annular corrugations preformed in one end portion of the sleeve, a glove formed of rubber-like material and comprising a hand portion and a wrist portion, the wrist portion of the glove being inserted into said one end portion of the sleeve, an annular band with a spaced pair of substantially rigid rings thereon located within said wrist portion of the glove at a point coinciding with said annular corrugations in the sleeve, said rings pressing the wrist portion of the glove into the preformed corrugations of the sleeve to detachably connect the glove to the sleeve, and an elastic ring located around the sleeve between the preformed corrugations therein and pressing the adjacent portion of the sleeve and glove together and against opposed sides of said spaced rings.

4. A combined glove and sleeve for dry box work comprising a sleeve formed of rubber-like material, a spaced pair of outwardly disposed annular corrugations preformed in one end portion of the sleeve, a glove formed of rubber-like material and comprising a hand portion and a wrist portion, the wrist portion of the glove being inserted into said one end portion of the sleeve, an annular band with a spaced pair of substantially rigid rings thereon located within said wrist portion of the glove at a point coinciding with said annular corrugations in the sleeve, said rings pressing the wrist portion of the glove into the preformed corrugations of the sleeve to detachably connect the glove to the sleeve, and means pressing the portion of the sleeve between said preformed corrugations and the adjacent portion of the glove together and against said band.

5. A combined glove and sleeve for dry box work comprising a sleeve formed of rubber-like material, a spaced pair of outwardly disposed annular corrugations preformed in one end portion of the sleeve, a glove formed of rubber-like material and comprising a hand portion and a wrist portion, the wrist portion of the glove being inserted into said one end portion of the sleeve, an annular band with a spaced pair of substantially rigid rings thereon located within said wrist portion of the glove at a point coinciding with said annular corrugations in the sleeve, said rings pressing the wrist portion of the glove into the preformed corrugations of the sleeve to detachably connect the glove to the sleeve, and an elastic ring located around the sleeve between the preformed corrugations therein and pressing the adjacent portions of the sleeve and glove together and against said band and the opposed sides of said spaced rings.

References Cited in the file of this patent
UNITED STATES PATENTS

| | | |
|---|---|---|
| 2,842,773 | Trexler | July 15, 1958 |

FOREIGN PATENTS

| | | |
|---|---|---|
| 1,011,264 | France | June 20, 1952 |